United States Statutory Invention Registration [19]

[11] Reg. Number: H14

Lewis [45] Published: Jan. 7, 1986

[54] ADAPTIVE DOPPLER FILTER BANKS

[75] Inventor: Bernard L. Lewis, Satellite Beach, Fla.

[73] Assignee: The Government of the United States, Washington, D.C.

[21] Appl. No.: 767,205

[22] Filed: Aug. 19, 1985

[51] Int. Cl.[4] ..... G01S 13/52; G01S 7/30

[52] U.S. Cl. ..... 343/7.7; 343/17.1 R

[56] References Cited

U.S. PATENT DOCUMENTS

| | | | |
|---|---|---|---|
| 4,028,697 | 6/19/77 | Albanese et al. | 343/5 R |
| 4,053,885 | 10/19/77 | Tomita et al. | 343/7.7 |
| 4,086,592 | 4/19/78 | Lewis et al. | 343/7.7 X |
| 4,222,050 | 9/19/80 | Kiuchi et al. | 343/7.7 |
| 4,459,592 | 9/19/84 | Long | 343/7 A |
| 4,496,949 | 1/19/85 | Bettini et al. | 343/7.7 |

*Primary Examiner*—T. H. Tubbesing
*Assistant Examiner*—Gilberto Barrón, Jr.
*Attorney, Agent, or Firm*—Robert F. Beers; William T. Ellis

[57] ABSTRACT

A radar system for cancelling radar clutter with a minimum of equipment comprising an N-point Fast Fourier Transform for dividing the radar's doppler space into N contiguous frequency subbands; a delay line disposed at each frequency output port for the FFT for obtaining a set of M+1 consecutive samples from each subband, with the sampling performed at the radar's pulse repetition rate divided by N; a single M degree-of-freedom adaptive-canceller moving-target indicator; and M+1 commutating switches for consecutively applying different sets of M+1 subband samples to the MTI. This operation permits clutter cancellation in each subband with N different frequency zeros placed in the radar's doppler space for each MTI degree-of-freedom.

12 Claims, 1 Drawing Figure

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

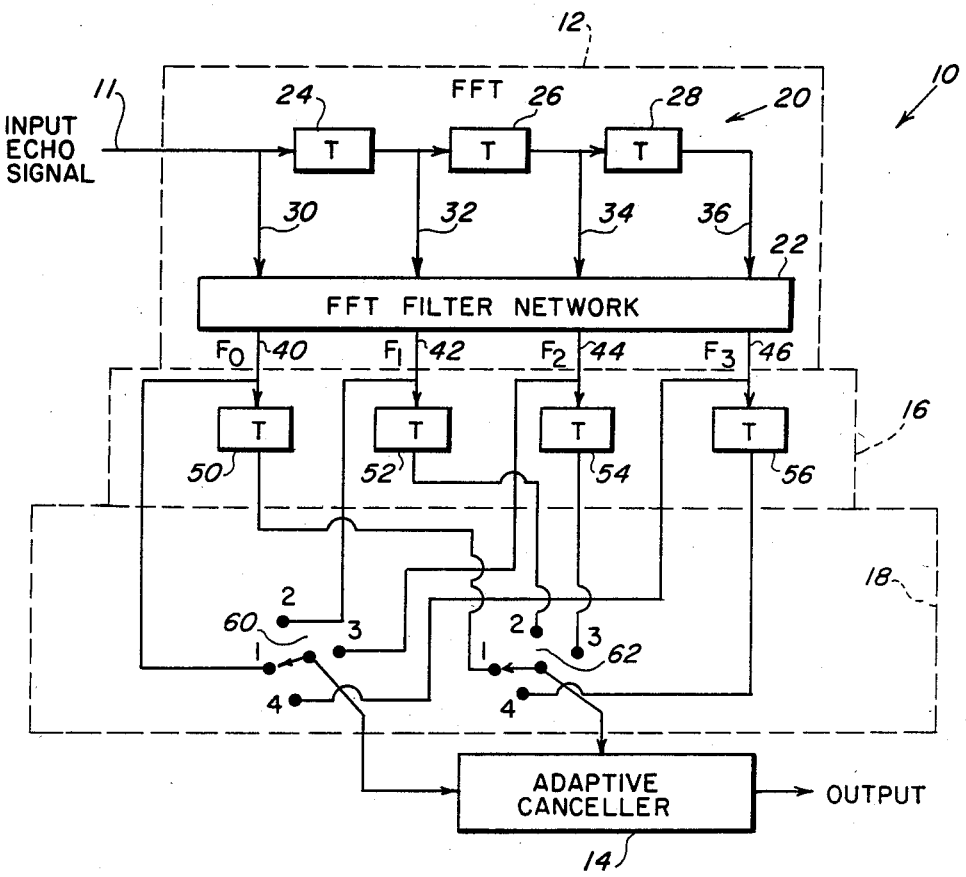
12
10
11
INPUT
ECHO
SIGNAL
24
FFT
26
28
20
T
T
T
30
32
34
36
22
FFT FILTER NETWORK
F0
40
F1
42
F2
44
F3
46
T
T
T
T
16
50
52
54
56
18
2
60
3
1
4
2
3
62
1
4
ADAPTIVE
CANCELLER
OUTPUT
14

ADAPTIVE DOPPLER FILTER BANKS

BACKGROUND OF THE INVENTION

The present invention is directed generally to systems for the cancellation of radar clutter, and more particularly to a radar clutter cancellation system formed with a minimum of hardware.

A radar echo return usually contains both the target signal and a clutter signal. The clutter signal arises from reflections from stationary and slow moving background objects, i.e., rain, chaff, land, and is usually much stronger than the target signal. This unwanted clutter, however, can be discriminated against by the use of a clutter cancelling system. A clutter cancelling system operates on the principle that the moving target has a doppler frequency shift, but that the stationery or slow moving clutter has none or very little. Typically, such clutter cancelling systems are designed in one of two ways. The first way is to configure the system to divide the doppler frequency space into two regions—a stop-band region and a pass-band region. The doppler frequency space comprises the frequencies between 0 and the pulse repetition frequency. By properly choosing the width and location of the system's stop-band regions, it is possible to effectively reduce the clutter noise to an acceptable level. This type of system is generally referred to as an MTI canceller. The second type of system utilizes a plurality of frequency filters to divide the doppler frequency space into many narrow regions. Each filter corresponds to one of these narrow frequency bands. This type of filter is generally referred to as a doppler filter and is formed typically by an FFT (Fast Fourier Transform) network. This doppler filter not only can be used to discriminate against the unwanted clutter, but can also be used to resolve the target doppler frequency and to provide improvement against noise. Recently-developed doppler filter systems employ adaptive doppler filter banks and require large numbers of digital calculations to be made in a short time. The amount of hardware involved to implement these systems and the speed at which this hardware must operate tend to make these systems impractical.

OBJECTS OF THE INVENTION

Accordingly, an object of the present invention, is to cancel radar clutter from a radar signal with a minimum amount of hardware.

It is yet another object of the present invention to significantly reduce the number of operations required in an adaptive doppler filter bank in order to cancel clutter.

Other objects, advantages, and novel features of the present invention will become apparent from the detailed description of the invention, which follows the summary.

SUMMARY OF THE INVENTION

Briefly, the above and other objects are realized with a radar system for cancelling radar clutter comprising an N subband doppler filter bank for dividing the doppler frequency space of a radar input signal into N frequency subbands and generating a separate subband output signal for each of the subbands; an M degree-of-freedom adaptive moving-target indicator circuit; means for obtaining a set of M+1 consecutive samples for each of the subband output signals sampled at a rate of the radar system's pulse repetition rate divided by N; and means for applying each subband set of M+1 consecutive samples to the adaptative moving-target indicator circuit in a desired order to remove radar clutter.

In a preferred embodiment, the applying means is formed by M+1 commutating switches, with each commutating switch having N positions, designated from 1 to N, commutating at the pulse repetition rate. Also, the sample obtaining means may simply be comprised of N delay lines, with a different delay line connected to delay a different separate subband output signal, with each of the delay lines having M series connected delays, where M is equal to or greater than 1, and wherein each of the M series-connected delays is equal to the radar interpulse period. Each of these delay lines are then tapped in order to obtain the set of M+1 tapped signals for the particular subband, with each one of these M+1 tapped signals applied to a different one of the M+1 commutating switches. The N subband doppler filter bank may be implemented by a Fast Fourier Transform circuit, and these N frequency subbands may be contiguous and equal in bandwidth.

BRIEF DESCRIPTION OF THE DRAWING

The FIGURE is a schematic block diagram of one embodiment of the present invention.

DETAILED DESCRIPTION OF THE PREFERRED EMBODIMENT

The present invention is based on the placement of a single adaptive moving target indicator (MTI) in the output of an N subband filter bank, and commutating this single MTI unit from filter port to filter port of the doppler filter bank output.

A basic radar clutter cancelling system 10 using the present inventive design is shown in schematic form in the FIGURE. The system 10 comprises an N subband doppler filter bank 12 for dividing the doppler frequency space of an input radar echo signal from line 11 into N frequency subbands and generating a separate subband output signal for each of these subbands; an M degree-of-freedom adaptive moving-target indicator circuit 14; means 16 for obtaining a set of M+1 consecutive samples for each of the subband output signals; and means 18 for applying each set of M+1 consecutive subband samples to the adaptive moving-target indicator circuit 14 to effect a cancellation of the radar clutter in that subband.

Referring now to the N subband doppler filter bank, the purpose of this filter bank is to divide the radar's doppler space into N contiguous subbands, each of which spans 1/N of the radar's doppler space. In this context, the radar's doppler space extends from 0 frequency to the radar's pulse repetition rate. Targets moving away from or toward the radar position will cause a phase shift (doppler frequency) between two adjacent radar echo pulses. This phase shift is equal to $2\pi F_d T$, where $F_d$ is the doppler frequency, and T is the pulse repetition period for the radar. If the phase shift resulting from the target doppler frequency equals 0 or $2\pi$, then it will cancel with the next adjacent echo pulse, as if no doppler frequency shift had occurred. Thus, the doppler frequency space is generally defined within the range 0 and $2\pi$.

The N subband doppler filter bank 12 may be implemented in a number of different configurations. In a preferred embodiment, when digital signal processing is utilized, the doppler filter bank 12 may be implemented by either a Fast Fourier Transform (FFT), or a discrete Fourier Transform. If the radar signal is a continuous wave signal, then an analog filter bank may be utilized to obtain the doppler frequency subbands.

In the embodiment shown in the FIGURE, the doppler filter bank 12 is implemented by an FFT circuit comprising a delay line 20 in combination with an N point FFT filter network 22. In the FIGURE, the FFT is a 4-point FFT. Accordingly, the delay line 20 includes three delay blocks, 24, 26, and 28, each set to provide a delay of the radar interpulse perod T. Then, the signal is tapped before the first delay block 24 and after each of the delay blocks 24, 26 and 28, in order to obtain four individual samples. These four samples are provided on lines 30, 32, 34 and 36, to FFT filter network 22.

The FFT filter network 22 may be realized by a conventional FFT filter network of the type described in Skolnick's *Radar Handbook,* chapter 35–15, McGraw-Hill Book Company, 1970.

One set of weights which may be utilized to implement a 4-point FFT is as follows: 0,0,0,0 for the DC component; $0,\pi/2,\pi,3\pi/2$, for the frequency fundamental; $0,\pi,0,\pi$ for the second harmonic; $0, 3\pi/2,\pi,\pi/2$ for the third harmonic. These frequency weights for this type of 4-point FFT implementation are disclosed in the article by B. L. Lewis, and F. F. Kretschmer, Jr. "New Class of Polyphase Pulse Compression Codes and Techniques," IEEE Transactions on Aerospace and Electronics Systems, Vol. AES-17, No. 3, May 1981, pages 364–372.

Referring now to the adaptive canceller 14, this canceller may take a variety of configurations and can use any degree-of-freedom that is desirable. This canceller can clearly be implemented by any form of open or closed loop adaptive canceller system. With respect to the term degree-of-freedom, the operation of subtracting two successive echo pulses to cancel clutter is viewed as one degree-of-freedom. Likewise, the operation of subtracting a first and a sescond pulse and a second and a third pulse and then subtracting the resulting differences is viewed as a second degree-of-freedom and removes first derivative clutter. The literature clearly discloses circuitry for providing third, fourth, and higher degrees-of-freedom for the adaptive canceller circuit. By way of example, and not by way of limitation, the following cancellers can be utilized to implement the canceller 14 of the present invention: the Gram Schmidt open loop canceller described in the article, "Adaptive MTI and Doppler Filter Bank Clutter Filter Processing," by F. F. Kretschmer, Jr., B. L. Lewis, and Feng Ling C. Lin, March Radar Symposium, Atlanta, IEEE 1984; the Howells closed loop canceller as described in U.S. Pat. No. 3,202,990.

In a preferred embodiment, the adaptive canceller 14 may be implemented by an M degree-of-freedom adaptive MTI digital open loop canceller of the type described in U.S. Pat. No. 4,086,592 by Lewis and Kretschmer, Jr.

It should also be noted that the adaptive MTI canceller 14 may use sliding-window-derived weights obtained from range cells adjacent to those that the weights are being used on, in order to prevent target cancellation. This sliding-window-weight configuration is described in the article, "A Digital Open Loop Adaptive Processor," by F. F. Kretschmer, Jr. and B. L. Lewis, IEEE Transactions on Aerospace and Electronic Systems, Vol. AES-14, No. 1, January 1978.

In order to implement M degree-of-freedom adaptive canceller 14, a set of $M+1$ consecutive samples must be obtained for each of the subband output signals $F_0,F_1,F_2, F_3$, at the ports 40, 41, 44, and 46, respectively. These samples may be obtained using a sampling rate of the radar system's pulse repetition rate divided by N. It should be noted that this lower sampling rate may be utilized since the Nyquist rate for proper sampling is determined by the bandwidth of the subband, and not the entire doppler frequency space.

In order to obtain $M+1$ samples for an M degree-of-freedom adaptive canceller 14, N delay lines are provided, with a different delay line connected to the output port of each of the frequency ports for the FFT filter network 22. In the FIGURE, the delay line 50 is connected to the frequency port 40, the delay line 52 is connected to the frequency port 42, the delay line 54 is connected to the frequency port 44, and the delay line 56 is connected to the frequency port 46. Each of these delay lines 50–56 is comprises M series-connected delays, where M is equal to or greater than 1, and wherein each of the M series-connected delays is equal to the radar interpulse period T. For each delay line, means are then provided for tapping the signal on that delay line at the beginning and after each of the M delays, in order to provide $M+1$ samples from that delay line.

By way of example and not by way of limitation, and for clarity of drawing representation, only a 1-degree-of-freedom adaptive canceller 14 was utilized in the FIGURE. Accordingly, each of the delay lines 50, 52, 54 and 56 is comprised of only a single delay block. Samples are taken at the input and the output for each of these delay blocks to provide two samples for application to the adaptive canceller 14.

One of the important features of the present invention is the use of a single adaptive MTI for cancelling the clutter from each of the frequency ports 40–46 of the FFT 12. Accordingly, the applying means 18 is utilized to apply each set of $M+1$ consecutive subband samples to the adaptives moving-target indicator circuit 14. This applying means 18 may take a variety of configurations. In the preferred embodiment shown in the FIGURE, the applying means may be formed by $M+1$ commutating switches, with each of these commutating switches having N positions designated from 1 to N, and commutating at the pulse repetition rate for the radar. In the present instance, for one degree-of-freedom, i.e., where $M=1$, there will be $M+1$, or, 2, commutating switches 60 and 62. Each of these commutating switches 60 and 62 has N positions. In the present instance, for a 4-point FFT 12, there are 4 positions, numbered 1–4 for each of the switches. Each set of $M+1$ tapped signals from a given delay line (corresponding to one frequency port) is applied to the same numbered position of a different one of the $M+1$ commutating switches. Each of the different delay lines 50–56 has its set of tapped signals applied to a different numbered position of the commutating switches.

In operation of the embodiment shown in the FIGURE, a series of N radar echo signals are fed into the tapped delay line 20 for the Fast Fourier Transform circuit 12. The Fast Fourier Transform circuit 12 operates to divide the doppler frequency space between 0 frequency and the pulse repetition frequency for the radar system into N frequency subbands.

The Fast Fourier Transform circuit generates a separate subband output signal for each of the N frequency subbands. In the present instance, there are 4 frequency output ports 40–46 and the subbands are contiguous and equal to 1/N of the radar's doppler space in bandwidth. The sample obtaining means 16, realized by the delay lines50–56, provides a set of M+1 consecutive samples from each subband output signal, i.e., frequency port. Thus, for the one degree-of-freedom adaptive canceller used in the example of the FIGURE, two samples are obtained from each frequency port, sampled at the rate of the radar system's pulse repetition rate divided by 4. The applying means 18, realized by the commutating switches 60 and 62, operates to commutate the adaptive canceller 14 from frequency port to frequency port at the radar's pulse repetition rate. The rotating poles for each of the commutating switches 60 and 62, commutate in synchronism on identical numbered positions of the switches. Accordingly, the switches 60 and 62 might both begin at the No. 1 switch position in order to apply the 2 samples from the $F_0$ frequency port 40 to the adaptive canceller for clutter cancellation. After one radar interpulse period, these rotating poles commutate to the next switch position, No. 2, and provide the two samples from the frequency $F_1$ port 42 to the adaptive canceller 14 for clutter cancellation. The switches 60 and 62 then commutate to the switch positions 3 and 4, in synchronism, in the same manner. Accordingly, the adaptive canceller MTI 14 is commutated from frequency port to frequency port at the radar's pulse repetition. This causes each FFT circuit output port to be sampled for a radar interpulse period at a rate equal to the radar's pulse repetition frequency divided by N.

The advantage of the present invention over the prior art is in its simplicity and the fact that it obtains optimum results with a minimum amount of hardware. In particular, only 1/N of the MTI equipment used in prior MTI designs is required for the present design. The present design allows N different zeros to be placed in the radar's doppler frequency space for each MTI degree-of-freedom (one frequency zero in each of the N subbands) and only requires M/N of the operations that are required in prior art fully adaptive doppler filter bank designs. Note that in the present context, the placement of a frequency zero at a particular frequency in a subband implies that all other frequencies in the subband will be passed thru the canceller. This design thus permits the adaptive canceller MTI to sense where the frequency zeros should be placed in the subbands in order to cancel the clutter. Accordingly, the present invention operates to cancel radar clutter without cancelling echos from targets moving relative to this clutter. This clutter cancellation function is performed with a minimum amount of hardware. It should be noted that the present invention can be implemented in either analog or digital form.

Obviously many modifications and variations of the present invention are possible in light of the above teachings. It is therefore to be understood that within the scope of the appended claims, the invention may be practiced otherwise than as specifically described.

What is claimed and desired to be secured by Letters Patent of the United States is:

1. A radar system for cancelling radar clutter with a minimum of hardware, said radar system having a radar signal with a doppler frequency space, a pulse repetition rate and an interpulse period, comprising;

a radar echo signal input;

an N subband doppler filter bank for dividing the doppler frequency space of said input signal into N frequency subbands and generating a separate subband output signal for each of said subbands.

an M degree-of-freedom adaptive moving-target indicator circuit, where M is equal to or greater than one;

means for obtaining a set of M+1 consecutive samples from each of said subband output signals, sampled at a rate of the radar system's pulse repetition rate divided by N; and means for consecutively applying each set of M+1 consecutive subband samples to said adaptive moving-target indicator circuit in a desired order to remove radar clutter.

2. A radar system as defined in claim 1, wherein said applying means comprises M+1 commutating switches, with each commutating switch having N positions, designated from 1 to N, commutating at the pulse repetition rate.

3. A radar system as defined in claim 2, wherein said sample obtaining means comprises N delay lines, a different one of said delay lines connected to delay a different separate subband output signal, each of said delay lines having M series-connected delays, wherein each of said M series-connected delays is equal to said radar interpulse period; and means for tapping the signal at the beginning, the end, and between said delays in each of said delay lines to obtain a set of M+1 tapped signals from each delay line, and for each set, applying each of said M+1 tapped signals in said set to the same numbered position of a different one of said M+1 commutating switches, with each different delay line set of tapped signals applied to a different numbered position of said commutating switches.

4. A radar system as defined in claim 3, wherein said N subband doppler filter bank is an N-point Fast Fourier Transform circuit for dividing the doppler frequency space into N equal, contiguous frequency subbands.

5. A radar system for cancelling radar clutter with a minimum of hardware, said radar system having a pulse repetition frequency and an interpulse period, comprising:

an N-subband doppler filter bank circuit for dividing the doppler frequency space between zero frequency and the pulse repetition frequency for the radar system into N frequency subbands and generating a separate subband output signal at a different output port for each of said N frequency subbands;

means for applying a radar echo signal to said doppler filter bank circuit;

N delay lines, a different one of said delay lines connected to each of said separate subband output ports, each of said delay lines having M series connected delays, where M is equal to or greater than one, and wherein each of said M series-connected delays is equal to said radar interpulse period;

M+1 commutating switches, with each commutating switch have N positions, numbered from 1 to N, commutating at the pulse repetition rate;

means for tapping the signal at the beginning, the end and between said delays in each of said delay lines to obtain a set of M+1 tapped signals from each of said N delay lines, and for each set, applying each of said M+1 tapped signals in said set to the same numbered position of a different one of said M+1 commutating switches, with each different delay line set of tapped signals applied to a different numbered position of said commutating switches; and a single M degree-of-freedom moving-target indicator connected to each of said M+1 commutating switches for adaptively cancelling clutter in each of said frequency subbands.

6. A radar system as defined in claim 5, wherein said N subband doppler filter bank is an N-point Fast Fourier Transform for dividing the radar's doppler frequency space into N equal, contiguous subbands.

7. A radar system as defined in claim 6, wherein M=1.

8. A radar system as defined in claim 6, wherein said moving target indicator is an open loop adaptive canceller.

9. A radar system as defined in claim 6, wherein said moving target indicator is a closed-loop adaptive canceller.

10. A radar system as defined in claim 6, wherein said moving target indicator uses sliding-window-derived weights.

11. A method for cancelling radar clutter with a minimum of hardware, in a radar system with a pulse repetition frequency, comprising the steps of:

dividing and filtering the doppler frequency space between zero frequency and the pulse repetition frequency of a radar echo signal into N contiguous frequency subbands and generating separate subband output signals for each of said N frequency subbands;

sampling at the radar system pulse repetition rate divided by N each of said separate subband output signals to obtain a set of M+1 consecutive samples for each subband , where M is greater than or equal to one; and adaptively cancelling with the appropriate set of M+1 consecutive subband samples the clutter from each of said frequency subband output signals.

12. A method as defined in claim 11, wherein said adaptively cancelling step includes the step of commutatively switching each set of M+1 consecutive subband samples consecutively to a single M+1 degree-of-freedom adaptive moving-target indicator circuit.

* * * * *